United States Patent [19]

Dages

[11] Patent Number: 5,322,875
[45] Date of Patent: Jun. 21, 1994

[54] POLYVINYLBUTYRAL-BASED THERMOPLASTIC COMPOSITION, USEFUL FOR FIXING BASES ON A GLAZING

[75] Inventor: Daniel Dages, Les Mureaux, France

[73] Assignee: Saint-Gobain Vitrage, Courbevoie, France

[21] Appl. No.: 929,508

[22] Filed: Aug. 18, 1992

Related U.S. Application Data

[63] Continuation of Ser. No. 532,351, Jun. 4, 1990, abandoned, which is a continuation of Ser. No. 362,665, Jun. 7, 1989, abandoned.

[30] Foreign Application Priority Data

Jun. 7, 1988 [FR] France .................. 8807531

[51] Int. Cl.⁵ .................. C09J 11/06
[52] U.S. Cl. .................. 524/304; 524/151; 524/557
[58] Field of Search .............. 524/128, 285, 287, 304, 524/308, 314, 315, 317, 350, 353, 151, 304, 557

[56] References Cited

U.S. PATENT DOCUMENTS

| 3,644,217 | 2/1972 | Cyba | 524/89 |
|---|---|---|---|
| 3,950,305 | 4/1976 | Schmidt | 524/147 |
| 4,187,212 | 2/1980 | Zinke et al. | 524/101 |
| 4,243,572 | 1/1981 | Dagés | 428/437 |
| 4,390,594 | 6/1983 | Dages | 428/437 |
| 4,526,918 | 7/1985 | Burton | 524/128 |

FOREIGN PATENT DOCUMENTS

| 1266740 | 3/1990 | Canada . |
| 148397 | 7/1985 | European Pat. Off. . |
| 0287416 | 10/1988 | European Pat. Off. . |

OTHER PUBLICATIONS

Kirk–Othmer, *Encyclopedia of Chemical Technology*, 3rd Ed., vol. 13, pp. 981, 988, 989 (1981).
Billmeyer, Jr., F., "Textbook of Polymer Science", 3rd Ed., John Wiley and Sons, New York, 1984, pp. 394–395.

*Primary Examiner*—Joseph L. Schofer
*Assistant Examiner*—R. H. Delmendo
*Attorney, Agent, or Firm*—Oblon, Spivak, McClelland, Maier & Neustadt

[57] ABSTRACT

A polyvinylbutyral-based thermoplastic composition which is useful for forming thermoadhesive films for adhering bases onto a glazing. The composition comprises a polyvinylbutyral resin with a hydroxyl group content of between 22 and 26% by weight, a plasticizer for the resin and an orthosubstituted phenolic antioxidizing agent. This composition is useful for forming a thermoadhesive film having good adhesion at the surface of the glass and good stability at high temperatures.

1 Claim, No Drawings

POLYVINYLBUTYRAL-BASED THERMOPLASTIC COMPOSITION, USEFUL FOR FIXING BASES ON A GLAZING

This application is a continuation of application Ser. No. 07/532,351 filed Jun. 4, 1990 abandoned, which is a continuation of Ser. No. 07/362,665 filed Jun. 7, 1989 which is now abandoned.

BACKGROUND OF THE INVENTION

1. Field of the Invention

The invention relates to a plasticized, polyvinylbutyral-based (PVB), thermoplastic composition, and to a thermoadhesive film obtained by extrusion of said composition, which is useful for the adhesion of glazing bases on a glazing.

2. Discussion of the Background

It is known to use thermoplastic polymers, such as plasticized polyvinylbutyral, to adhere glazing bases onto a glazing. These bases can then serve to produce objects, such as rear-view mirrors.

Generally, a plasticized polyvinylbutyral resin film is applied using heat to the surface of a base which, for example, is made of metal. The assembly is then heated and the surface of the base bearing the polyvinylbutyral film is adhered to the glass surface by applying suitable pressure for a few seconds. The final adhesion is obtained in an autoclave. An object, such as a rear-view mirror, can then be fixed to the base.

These bases are frequently subjected to various mechanical stresses, due to the manipulation of the object which is fixed thereto, for example due to adjustment of a rear-view mirror. It can also be subjected to varied heat conditions, in particular high temperatures when the glazing is heated by the sun.

The thermoadhesive polyvinylbutyral film must therefore have certain properties, particularly good adhesion to the glass and to the material comprising the base, which is generally metallic, and good stability in high temperatures.

French Patent Application No. 87 04 620, filed Apr. 2, 1987, by applicant, describes a plasticized polyvinylbutyral resin having improved properties of adhesion to the glass and temperature stability, which is therefore useful for adhering bases onto glazings. The polymer is prepared from polyvinyl alcohol, having a rate of hydrolysis which is greater than 95% and a viscosity greater than 50 centipoises, and butyraldehyde in a sufficient amount that the amount of hydroxyl groups in the polymer is between 22 and 26% by weight relative to the polymer.

The polyvinylbutyral (PVB) described in this patent, which has a fairly high molecular weight (between 300,000 and 500,000 by weight) and a high proportion of hydroxyl groups, has good adhesion to the glass and provides an improvement in the resistance to high temperatures of films obtained from the polymer.

The polymers with a high molecular weight have the disadvantage of high rigidity which causes difficulties during their shaping. In addition, defects (formation of bubbles) are observed when, in particular, the thickness of the film is not uniform or when the glazing on which the film is adhered has a large curvature, which spoils the appearance of the glazing.

It is desirable, for the adhesion of the bases, to be able to use resins with a fairly high molecular weight, such as those described in the above-identified patent application, as well as resins with a lower molecular weight to overcome the disadvantages in shaping, all of which enable the formation of films having appropriate stability at high temperatures and cause no problems in appearance upon adhesion.

SUMMARY OF THE INVENTION

Accordingly, one object of the present invention is a polyvinylbutyral resin-based thermoplastic composition, which is useful for the formation of a heat-stable thermoadhesive film with good adhesion, in particular to glass.

The thermoplastic composition in accordance with the invention contains a polyvinylbutyral resin and a plasticizer for the resin, wherein the proportion of hydroxyl groups in the resin is between 22 and 26% by weight. In addition, the composition contains an ortho-substituted phenolic antioxidizing agent.

DETAILED DESCRIPTION OF THE PREFERRED EMBODIMENTS

The antioxidizing agent of the present compositions is a phenolic compound which is preferably substituted at the ortho position by a tertiary butyl group.

The antioxidizing agent is preferably selected from the group of di-tert-butyl paracresol, tris (2,4-di-tert-butylphenyl) phosphite, 3,5-(di-tert-butyl-4-hydroxyphenyl) octadecylpropionate and pentaerythritol tetrakis-(3,5-di-tert-butyl-4-hydroxyphenylpropionate).

The amount of antioxidizing agent is generally greater than about 0.5 parts by weight per 100 parts of resin and, preferably, it is between about 0.5 and 2 parts by weight.

The polyvinylbutyral resin can be obtained by any known method, but it must have a proportion of hydroxyl groups between 22 and 26% by weight, preferably 23–25% by weight relative to the resin. A resin with a proportion of hydroxyl groups of less than 22% does not have the desired properties for the adhesion of bases, in particular the appropriate adhesion to the glass. When the proportion of hydroxyl groups in the polyvinylbutyral is greater than 26%, the final product is too rigid, is difficult to use and the adhesion is unsatisfactory. The molecular weight of the resin is preferably between about 100,000 and 500,000. A resin with too high a molecular weight has a high rigidity which can cause defects in adhesion.

Any compound which is compatible with the polyvinylbutyral resin can be used as a plasticizing agent. Suitable plasticizing agents for the polyvinylbutyrals useful in the invention are, for example, triethyleneglycol diethyl-2-butyrate, dibutyl sebacate, dihexyl adipate, dibutoxyethyl adipate and those described in European Patent Applications Nos. 11 577 and 47 215, that is, octyl and benzyl adipate and a mixture of octyl and benzyl adipate with di-n-hexyl adipate.

The appropriate amount of plasticizing agent depends on the quantity of the residual hydroxyl groups of the polymer and can easily be determined by one skilled in the art. From 17 to 30 parts by weight of plasticizing agent per 100 parts of polyvinylbutyral resin is generally used in the invention.

The composition in accordance with the invention may contain conventional amounts of other additives, such as pigments like carbon black, anti-ultraviolet (UV) compounds, stabilizing agents, etc.

The present composition may also contain organosulfur compounds, such as dilauryl thiodipropionate, which combined with the phenolic antioxidizing agents, synergistically increase their activity. In addition, these organosulfur compounds are useful when the thermoplastic composition contains carbon black. In effect, the carbon black can cause a decrease in the activity of the antioxidizing agents. The addition of organosulfur compounds enables the activity of the phenolic antioxidizing agents to be regenerated. These organosulfur compounds are added, for example, in an amount of greater than about 0.1 parts by weight per 100 parts of PVB resin and are limited to amounts which do not cause deterioration of the adhesion and high temperature stability properties of the composition.

The thermoplastic composition can be prepared by any conventional method. Thus, the PVB resin can be placed in a mixer and the plasticizer combined with the antioxidizing agent and the other additives, if there are any, can then be added. After obtaining a homogeneous mixture, the mixture can be extruded to form films with a thickness, for example, of 0.3 to 1 mm.

The films obtained are cut to the desired dimensions and heat fixed onto the bases intended to be adhered to a glazing. These bases can be in any appropriate material, for example, steel, nickel, aluminum, a metal alloy, etc. These bases provided with the PVB resin are heated and then fixed by pressure onto a preheated glazing.

Other features of the invention will become apparent in the course of the following descriptions of exemplary embodiments which are given for illustration of the invention and are not intended to be limiting thereof.

EXAMPLES

EXAMPLE 1

A thermoplastic composition was prepared by mixing PVB resin having a molecular weight of approximately 400,000 and a proportion of hydroxyl groups of 25%, with a plasticizing agent (a mixture containing 65% by weight of octyl and benzyl adipate and 35% by weight of n-hexyl adipate). The amount of plasticizing agent was 25 parts by weight per 100 parts by weight of resin. Di-tert-butyl paracresol was added as the antioxidizing agent in an amount of 2 parts by weight per 100 parts of resin. The mixture was extruded to obtain a film with a thickness of 0.76 mm and a width of 5 cm.

The film was cut into strips with the desired dimensions and the strips were applied using heat (90° C. approximately) on a nickeled base. The base provided with the PVB film was heated to approximately 90° C. and the surface of the base bearing the film was pressed onto a sheet of glass which was preheated to approximately 80° C. for approximately 8 seconds.

The final adhesion of the base to the sheet of glass (to obtain a product A) was carried out in an autoclave at approximately 140° C. for approximately 30 minutes.

For reference purposes, a glass/PVB/base assembly (product B) in which the PVB was not combined with an antioxidizing agent was prepared in the same manner.

The assemblies obtained were submitted to the following tests to determine the stability in high temperatures of the PVB film, that is, its resistance to tearing at high temperature (heat flow test) and to evaluate the adhesion of the film to the surface of the glass.

Heat flow

A sample of the glass/PVB/base assembly was held vertically. A lever arm with a length of 50 mm was fixed to the base and a 500 g load was applied to the end of the lever arm. The assembly was placed in a chamber at 90° C. for 72 hours.

In order for the test to be positive, the base must not become detached.

Test of adhesion to a Glass surface
1) Cleaving test:
Normal cleaving

A lever arm with a length of 25 mm was fixed to the base adhered to the glass. The base was submitted to a traction force exerted parallel to the surface of the glass, at a speed of 10 mm/min.

The base must resist a force greater than 50 daN.
Moist cleaving

The same method as above was carried out after having submitted the adhered bases to a humidity cycle for 72 hours at 60° C. and 100% humidity. The base must resist a force greater than 50 daN.

2) Torsion test

The base was submitted to torsion using a dynamometric key. The following two conditions should be met: a) The adhesion must resist a torsion couple of at least 30 m.N. and b) The adhesion must resist a torsion couple of 20 m.N. for 30 seconds.

The tests to which the samples of the two products A and B obtained in Example 1 were submitted gave the following results:
heat flow test: good
cleaving at 20° C.: 90 daN
moist cleaving: 80 daN
torsion test a): 49 m.N.
torsion test b): good Reference product B did not become detached during the heat flow test, but at the glass/PVB interface numerous bubbles were observed which were visible through the glazing and, therefore, detrimental to its appearance.

EXAMPLE 2

As in Example 1, a glass/PVB/base product in accordance with the invention and a reference product in which the PVB was not combined with an antioxidizing agent were prepared. In both products a PVB resin was used which had a molecular weight of approximately 300,000, a proportion of hydroxyl groups of 25% and which was plasticized with 25 parts by weight of dibutoxyethyl adipate.

Only the base fixed with the thermoadhesive film in accordance with the invention was satisfactory in the heat flow test. The PVB films adhered well to the glazing.

This example shows that, even when using a lower molecular weight PVB, appropriate adhesion and stability in high temperatures for fixing bases to a glazing can be obtained.

EXAMPLE 3

Analogous to Example 1, a glass/PVB/base product in accordance with the invention was prepared, but a PVB resin was used with a molecular weight of approximately 250,000 and a proportion of hydroxyl groups of 26%, which was plasticized by using 22 parts by weight of the plasticizer of Example 1.

The product obtained was compared to product A in accordance with the invention, in which the PVB had a molecular weight of approximately 400,000 and in which the antioxidizing agent was used in a quantity of 2 parts for 100 parts by weight of resin. An improvement in adhesion was noted in the case of the product prepared in this example, compared to that of product A of Example 1.

The heat flow test was good.

This example shows that the presence of an antioxidizing agent in the thermoplastic composition enables a PVB with a lower average molecular weight to be used, thus obtaining good adhesion to the glass and, in addition, satisfactory stability to high temperatures, even when decreasing the amount of antioxidizing agent.

EXAMPLE 4

The method of Example 1 for product A was repeated, but a PVB was used with a molecular weight of approximately 200,000, and a proportion of hydroxyl groups of 22%, which was plasticized by using 26 parts by weight of the plasticizer of Example 1. Tris-(2,4-di-tert-butylphenyl) phosphite (Irganox 168 from Ciba-Geigy) was used as the antioxidizing agent in an amount of 1 part by weight for 100 parts of resin.

An analogous product was prepared from a thermoplastic composition further containing 1.7 parts by weight of animal black (from Prolabo) per 100 parts of resin. For the two products, the adhesion was good and the heat flow test was satisfactory.

EXAMPLE 5

The method of Example 4 was carried out, but the antioxidizing agent "Irganox 168" was replaced with 3,5-(di-tert-butyl-4-hydroxyphenyl) octadecyl propionate ("Irganox 1076" from Ciba-Geigy) and the animal black from Prolabo was replaced with smoke black "Printex 95" (Degussa).

The adhesion and heat flow tests were satisfactory.

EXAMPLE 6

The method Example 5 was carried out, but the antioxidizing agent was used in an amount of 0.6 parts by weight per 100 parts of resin and 0.4 parts by weight were added of the organosulfur compound, dilauryl thiodipropionate, per 100 parts of resin.

The tests for adhesion and stability at high temperatures were satisfactory.

EXAMPLE 7

For comparison purposes, a glass/PVB/base product was prepared as in Example 1, but the thermoplastic contained PVB with a molecular weight of approximately 200,000 and a proportion of hydroxyl groups of 25% with 1 part by weight of 4-tert-octyl-phenol as an antioxidizing agent.

The adhesion was good but the stability at high temperatures (heat flow test) was bad.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heat-stable thermoadhesive film for the adhesion of a base of metal to a glass substrate consisting essentially of a polyvinylbutyral resin, a plasticizer for said resin, an ortho-substituted phenolic antioxidizing agent, carbon black and dilauryldithiopropionate, wherein said polyvinylbutyral resin has a proportion of hydroxyl groups between 22 and 26% by weight relative to said resin.

* * * * *

UNITED STATES PATENT AND TRADEMARK OFFICE
CERTIFICATE OF CORRECTION

PATENT NO. : 5,322,875

DATED : June 21, 1994

INVENTOR(S) : Daniel DAGES

It is certified that error appears in the above-identified patent and that said Letters Patent is hereby corrected as shown below:

Column 6, line 32, "dilauryldithiopropionate" should read --dilaurylthiodipropionate--.

Signed and Sealed this

First Day of October, 1996

Attest:

BRUCE LEHMAN

Attesting Officer    Commissioner of Patents and Trademarks